United States Patent [19]
Vanderpool et al.

[11] 3,936,362
[45] Feb. 3, 1976

[54] PROCESS FOR THE MANUFACTURE OF AMMONIUM TUNGSTATE AMMONIUM PARATUNGSTATE, AMMONIUM METATUNGSTATE AND HYDRATED TUNGSTEN TRIOXIDE

[75] Inventors: Clarence D. Vanderpool; Martin B. MacInnis; James C. Patton, Jr., all of Towanda, Pa.

[73] Assignee: GTE Sylvania Incorporated, Stamford, Conn.

[22] Filed: June 10, 1974

[21] Appl. No.: 477,921

[52] U.S. Cl. .................. 204/86; 204/180 P; 423/53
[51] Int. Cl.². C25B 1/00; C25B 1/22; C01G 41/00; C01B 1/00
[58] Field of Search .............................. 204/86–93, 204/180 P; 423/53, 54

[56] References Cited
UNITED STATES PATENTS 3,464,783  9/1969  Patzauer ........................ 204/86 X
3,681,213  8/1972  Heit et al. ......................... 204/82

FOREIGN PATENTS OR APPLICATIONS 1,119,843  7/1968  United Kingdom ................. 204/86

Primary Examiner—F. C. Edmundson
Attorney, Agent, or Firm—Norman J. O'Malley; John C. Fox; Donald R. Castle

[57] ABSTRACT

Ammonium tungstate, ammonium paratungstate, ammonium metatungstate or hydrated tungsten trioxide is produced by passing tungstate anions through an anion exchange membrane into an aqueous solution containing ammonium cations under the driving force of an electrical potential for a time sufficient to achieve a pH within the range in which the desired tungsten compound will form.

8 Claims, No Drawings

PROCESS FOR THE MANUFACTURE OF AMMONIUM TUNGSTATE AMMONIUM PARATUNGSTATE, AMMONIUM METATUNGSTATE AND HYDRATED TUNGSTEN TRIOXIDE

BACKGROUND OF THE INVENTION

This invention relates to an electrolytic process for the manufacture of ammonium tungstate, ammonium paratungstate, ammonium metatungstate and hydrated tungsten trioxide by the use of an anion exchange membrane, and more particularly relates to the manufacture of one of the above tungsten compounds by the control of the pH of the electrolyte in the anodic compartment.

An important and characteristic feature of the tungstates is the formation of condensed complex anions of isopolytungstates in acid solution. If one considers polytungstates as formed by the addition of hydrated acid ($H_3O^+$) to the tungstate anion ($WO_4^{2-}$), then a series of isopolytungstates appear in which the ratio of hydrated acid groups to tungstate anion (and thus molecular weight), increases as pH is lowered. Paratungstates are formed at a ratio of 0.33 to 1.167; metatungstates are formed at a ratio of 1.5, and tungstic acid is formed at a ratio of 2.0.

These isopolytungstate compounds are widely used in the catalyst industry, usually as the ammonium salts, since the alkali metal and other salts would normally act as contaminants of the catalyst material.

Tungstic acid or hydrated tungsten trioxide is normally used as a starting material for the production of tungsten powder, which has a variety of uses including the starting material in various powder metallurgy processes.

Several techniques for the production of the ammonium tungstate compounds and tungstic acid exist.

Tungstic acid may be prepared by the acidification with mineral acid of most tungsten salts, for example sodium tungstate plus hydrochloric acid or calcium tungstate digested in hydrochloric acid gives a hydrated tungsten trioxide precipitate. This precipitate must then be washed, filtered and dried and must be kept strongly acidic during washing in order to prevent conversion to a colloidal form, rendering recovery by filtering exceedingly difficult. This process results in considerable free mineral acid and salt byproducts such as sodium chloride or calcium chloride, which must be disposed of.

Ammonium tungstate or ammonium paratungstate may be produced by dissolving hydrated tungstic trioxide in aqueous ammonia. This technique of course first requires the preparation of the hydrated tungsten trioxide, which tends to be time consuming and requires a large investment in equipment to handle the mineral acid.

Ammonium paratungstate may also be produced by the reaction in aqueous solution of ammonium chloride and sodium tungstate to precipitate insoluble ammonium paratungstate crystals. This method results in very low yields, and the ammonium paratungstate crystals tend to have entrapped sodium chloride, which cannot be easily removed.

Another method for the production of ammonium paratungstate is by liquid ion exchange (LIX) extraction of tungsten from sodium tungstate, followed by stripping the tungsten off the extractant with aqueous ammonia. This technique requires the addition of large amounts of strong mineral acid to the sodium tungstate solution in order to achieve the pH needed for LIX extraction. In consequence large amounts of the sodium salt such as sodium chloride or sodium sulfate are formed, which must be disposed of.

Ammonium metatungstate may be formed by dissolving hydrated tungsten trioxide in ammonium tungstate solution until a pH of about 2.5 to 4.0 is reached. This technique requires the addition of large amounts of hydrated tungsten trioxide which with lower pH values becomes less soluble in the solution. The excess must then be filtered out which may be difficult due to the tendency of the hydrated tungsten trioxide to colloidal formation. In addition, the yield is approximately 50%.

Another technique for the production of ammonium metatungstate is by addition of an ion exchange resin to ammonium tungstate solution or a slurry of ammonium paratungstate crystals until the required pH for formation of ammonium metatungstate is achieved. The use of ion exchange resins requires regeneration of these materials by the use of a strong mineral acid and the consequent formation of unwanted salt byproducts.

Other techniques for producing ammonium metatungstate involve boiling a slurry of ammonium paratungstate crystals or baking ammonium paratungstate crystals until at least about 6 moles of $NH_3$ are lost. These techniques tend to require excessive times or excessive handling for the production of commercial quantities.

The search thus continues for simple and inexpensive methods for producing the ammonium isopolytungstates and tungstic acid in good yield and relatively pure form.

SUMMARY OF THE INVENTION

In accordance with the invention a method has been discovered for manufacturing ammonium tungstate, ammonium paratungstate, ammonium metatungstate and tungstic acid requiring only ammonium hydroxide or other source of ammonium cations and a tungstate anion source as raw materials. These tungsten compounds can be manufactured in accordance with the invention without the production of useless byproducts and without the use of strong mineral acids, solvent extraction or precipitation reactions.

These tungsten compounds can all be produced in good yield and relatively free from cation impurities by passing tungstate anions under the influence of an electrical potential through an anion exchange membrane into an aqueous electrolyte containing ammonium cations until the desired pH of the electrolyte is reached for formation of the desired tungsten compound.

In another aspect of the invention, ammonium metatungstate or tungstic acid may be produced from normally insoluble ammonium paratungstate by using ammonium paratungstate crystals as the source of tungsten anions.

In another aspect of the invention, the alkali metal hydroxide formed by the removal of tungstate ions from alkali metal tungstate solution may be recovered and used to form additional alkali metal tungstates from tungsten sources such as ore concentrates.

DETAILED DESCRIPTION OF THE INVENTION

The anion exchange membrane may be any membrane which under the influence of an applied electrical potential will selectively pass the tungstate anions from the solution. Such membranes are well known in the art and are described for example in U.S. Pat. Nos. 3,784,457 and 3,795,595. These membranes may have ion exchange groups or material impregnated or distributed throughout a polymeric matrix or binder, or such groups may be associated only with the outer surface of a membrane backing or reinforcing sheet. In addition the entire membrane structure having ion exchange characteristics may be formed by molding or casting a partially polymerized ion exchange resin into a sheet. Various known anion exchange groups such as amine groups, ammonium groups, the guanidine group, the dicyandiamine group and other nitrogen-containing basic groups may be attached to a polymeric compound such as polystyrene resin, phenol formaldehyde resin, styrene-divinyl benzene copolymer, urea-formaldehyde resin, melamine-formaldehyde resin, polyalkylenepolyamine-formaldehyde resin, etc.

In addition to these organic membranes, inorganic ion exchange membranes may also be used, and a description thereof may be found in U.S. Pat. Nos. 3,479,267 and 3,463,713.

Typically these ion exchange membranes are reinforced by a backing sheet of a relatively inert material such as for example a porous structure of glass or ceramic or fabrics of asbestos, polyesters, polyamides, acrylics, rayons, polypropylene, and the like.

The thickness of the exchange membrane is not particularly critical, and will depend upon the particular operating conditions. While thicker membranes have a longer useful life, their electrical resistance increase proportionately to their thickness. In general, suitable membrane thicknesses may range from 0.5 mm to 1.5 mm.

Typical commercially available anion exchange membranes include those available from Ionics Inc., Watertown, Massachusetts; Ionic Chemical Company, Burmingham, New Jersey and AMF Inc., New York, New York.

In the practice of the invention, the anion exchange membrane divides an electrolytic cell container into two compartments. One compartment contains an electrode of positive polarity and the other contains an electrode of negative polarity. Both electrodes should be of a relatively nonreactive or inert material with regard to the electrolytes. Suitable electrode materials include graphite and the noble metals such as gold and platinum.

The aqueous solution of tungstate anions is added to the negative side (cathodic compartment) of the electrolytic cell. The concentration in solution may vary over a considerable range for example, from 10 grams $WO_3$ per liter up to saturation.

While any soluble metal tungstate salts are suitable, the alkali metal (Li, Na, K, Rb and Cs) salts are preferred because of their ready solubility and because upon removal of tungstate ion, they form alkali metal hydroxides which can be reused to form additional alkali metal tungstate, such as by leaching of tungsten ore concentrates.

The electrical potential required to remove tungstate anions from the aqueous salt solution will depend upon the concentration of the electrolyte, and the thickness of the cation membrane and the cell geometry. However, suitable operating potentials for the membrane generally range from 5 to 80 volts.

The solution containing ammonium cations is added to the positive side (anodic compartment) of the cell. The concentration should of course be sufficient to provide at least the stoichiometric amount for formation of the desired tungsten compound. When current passes through the cell, tungstate ion passes into the ammonium ion-containing solution and ammonium tungstate first forms at a pH of about 14 to 7. Then insoluble ammonium paratungstate precipitates at a pH of about 8 to 6. With continued passage of current, this normally insoluble precipitate will dissolve and act as a source of tungsten anions for the formation of ammonium metatungstate and tungstic acid, which form at a pH of about 4 to 2 and 2 to 0, respectively. When the concentration of $WO_3$ is at least 200 grams per liter and the applied potential is from 10 to 15 volts, these species successively begin to form after about 1 to 4 hours, 4 to 6 hours, 6 to 12 hours and 12 to 24 hours for ammonium tungstate, ammonium paratungstate, ammonium metatungstate and tungstic acid, respectively.

These times may be shortened by using an intermeidate compound as the tungsten anion source for successive compounds. Thus, ammonium tungstate may be a source for producing ammonium paratungstate, ammonium metatungstate and tungstic acid; ammonium paratungstate may be a source for ammonium metatungstate and tungstic acid; and ammonium metatungstate may be a source for tungstic acid.

EXAMPLE I

An electrolytic cell is divided into positive and negative sides by placing an anion exchange membrane (111BZ6066 from Ionics Inc., Watertown, Massachusetts) between 2 platinum electrodes each having a surface area of about 6 square inches and suspended by means of a platinum wire in the cell. 450 Milliliters of a sodium tungstate solution containing 213 grams of $WO_3$ per liter is placed on the negative side of the membrane. A solution of 400 milliliters of water with 10 milliliters of reagent grade (28% by weight) ammonium hydroxide is placed on the positive side of the membrane. A potential of about 12 volts is applied to the cell resulting in a current flow of about 1 ampere. After about 1 1/2 hours the current has increased to about two amperes, the pH has decreased from about 10 to about 9, and ammonium tungstate is formed. After about 6 hours the current has increased to about 3 amperes, the pH has decreased to about 8 and ammonium paratungstate crystals are formed. After about 12 hours, most of the ammonium paratungstate has dissolved, the pH has decreased to about 2.8, and ammonium metatungstate is formed. At this point the solution is removed from the positive side, evaporated down to form crystals, and the crystals identified by x-ray analysis as ammonium metatungstate.

EXAMPLE II

The procedure of Example I is followed, except that 400 mls. of tungstate solution containing 317 grams of $WO_3$ per liter is placed on the negative side of the membrane, a solution of 10 milliliters of 28% ammonium hydroxide in 400 milliliters of water is placed on the positive side, and a potential of about 10 volts is applied to the cell resulting in a current initially of about 0.5 amperes. After about 8½ hours the current has increased to about 2.5 amperes, and ammonium paratungstate crystals have formed. After about 29 hours, the pH has decreased to about 1.5 and tungstic acid has formed. The solution is evaporated to dryness and analyzed. Results show that the product contains hydrated tungsten trioxide, and the following impurities in the total amount of less than 0.1 weight percent: aluminum, calcium, copper, iron, magnesium, molybdenum, silicon, tin, and sodium. With the exception of molybdenum, all listed impurities are present in amounts less than about 100 parts per million.

EXAMPLE III

The procedure of Example I is followed, except that a 400 ml solution of sodium tungstate containing about 79 grams $WO_3$/liter is placed on the negative side of the membrane, and 10 milliliters of 28% ammonium hydroxide in 400 milliliters of water is placed on the positive side. After about 24 hours the current had increased from 1.5 to 4.5 amperes and ammonium paratungstate crystals have formed.

EXAMPLE IV

The procedure of Example I is followed except that in order to increase the current flow through the cell a solution of 1:1 by volume of ammonium tungstate (280 grams $WO_3$ per liter) and 28% ammonium hydroxide is placed on the positive side of the cell, and a solution of 280 grams per liter of $WO_3$ (sodium tungstate) is placed on the negative side of the cell. After about 6½ hours of cell operation, solution from the negative side is analyzed to show that 86.3% of the tungsten is removed. Essentially 100% of this tungsten is recovered in the form of ammonium paratungstate crystals from the positive side of the cell. These crystals as indicated by spectrographic analysis contain a total impurity content of less than 0.1 weight percent. Such impurities include the following: Al, Ca, Cu, Fe, Mn, Mo, Si. All the listed impurities each are less than 100 parts per million except molybdenum which was about 200 parts per million.

While there has been shown and described what are at present considered the preferred embodiments of the invention, it will be obvious to those skilled in the art that various changes and modifications may be made therein without departing from the scope of the invention as defined by the appended claims.

What is claimed is:

1. An electrolytic method for producing a tungsten compound selected from the group consisting of ammonium tungstate, ammonium paratungstate, ammonium metatungstate and tungstic acid, the method comprising:

a. contacting the negative side of an anion exchange membrane with an aqueous electrolyte containing a source of tungstate anions, and contacting the opposing side of the membrane with an aqueous electrolyte containing a source of ammonium cations, and b. applying an electrical potential across the anion exchange membrane, the potential having a magnitude and polarity to cause passage of the tungstate anions through the membrane into the electrolyte containing the ammonium cation source for a time sufficient to achieve a pH of the electrolyte to form the desired tungsten compound.

2. The method of claim 1 in which the source of tungstate anions is an alkali metal tungstate, and the source of ammonium cations is at least one member selected from the group consisting of ammonium hydroxide, ammonium tungstate, ammonium paratungstate and ammonium metatungstate.

3. The method of claim 1 in which the electrolyte containing tungstate anions has a concentration of at least 200 grams of $WO_3$ per liter, the electrical potential across the membrane is from 10 to 15 volts, and in which ammonium tungstate solution begins to form after about 1 to 4 hours, ammonium paratungstate begins to form after about 4 to 6 hours, ammonium metatungstate solution begins to form after about 6 to 12 hours, and tungstic acid begins to form after about 12 to 24 hours.

4. The method of claim 2 in which the source of tungstate anions is ammonium paratungstate, and the tungsten compound produced is selected from the group consisting of ammonium metatungstate and tungstic acid.

5. The method of claim 1 in which the tungsten compound produced is ammonium tungstate.

6. The method of claim 1 in which the tungsten compound produced is ammonium paratungstate.

7. The method of claim 1 in which the tungsten compound produced is ammonium metatungstate.

8. The method of claim 1 in which the tungsten compound produced is tungstic acid.

* * * * *